US012403849B2

(12) United States Patent
Kato et al.

(10) Patent No.: US 12,403,849 B2
(45) Date of Patent: Sep. 2, 2025

(54) PROTECTOR

(71) Applicant: YAZAKI CORPORATION, Tokyo (JP)

(72) Inventors: Shinji Kato, Makinohara (JP); Kazuhiro Tsutida, Makinohara (JP); Suginobu Iguchi, Makinohara (JP); Takumasa Suzuki, Makinohara (JP); Rikuya Saitou, Makinohara (JP); Tomohiro Shibata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 184 days.

(21) Appl. No.: 18/522,234

(22) Filed: Nov. 29, 2023

(65) Prior Publication Data
US 2024/0092285 A1 Mar. 21, 2024

Related U.S. Application Data

(63) Continuation of application No. PCT/JP2022/041717, filed on Nov. 9, 2022.

(30) Foreign Application Priority Data

Dec. 14, 2021 (JP) ................................ 2021-202243

(51) Int. Cl.
*B60R 16/02* (2006.01)
(52) U.S. Cl.
CPC ............................ *B60R 16/0215* (2013.01)

(58) Field of Classification Search
CPC .......... B60R 6/02; B60R 6/0215; H02G 11/00
See application file for complete search history.

(56) References Cited

U.S. PATENT DOCUMENTS

2018/0361957 A1* 12/2018 Kato .................... B60R 16/0215
2020/0139907 A1* 5/2020 Sano .................... B60N 2/0715

FOREIGN PATENT DOCUMENTS

JP 2021-16266 A 2/2021

* cited by examiner

*Primary Examiner* — Paresh Paghadal
(74) *Attorney, Agent, or Firm* — KENEALY VAIDYA LLP

(57) ABSTRACT

A protector includes a case main body and a cover member. The cover member includes the cover main body part, the first cover part, and the second cover part. The first cover part and the second cover part are at the positions overlapping with each other in the longitudinal direction when viewed from the lateral direction of the cover main body part, and form an insertion space for passing a third extension part of a wiring material WH through in the lateral direction when viewed from the orthogonal direction of the cover main body part. The first cover part includes a movable part that is movable in the orthogonal direction with respect to the cover main body part when viewed from the lateral direction of the cover main body part, and a hinge part that rotatably connects the cover main body part and the movable part.

4 Claims, 6 Drawing Sheets

PROTECTOR

CROSS-REFERENCE TO RELATED APPLICATION(S)

This application is a continuation application of International Application No. PCT/JP2022/041717 filed on Nov. 9, 2022 which claims the benefit of priority from Japanese Patent Application No. 2021-202243 filed on Dec. 14, 2021 and designating the U.S., the entire contents of which are incorporated herein by reference.

BACKGROUND OF THE INVENTION

1. Field of the Invention

The present invention relates to a protector.

2. Description of the Related Art

Wire harnesses routed to sliding seats and sliding doors loaded on automobiles and the like have extra length parts for allowing the sliding parts to be freely slidable. Such a wire harness with the extra length part is housed and protected in a protector, for example (see Japanese Patent Application Laid-open No. 2021-16266, for example).

By the way, the outer diameter of the wiring material housed in the protector is becoming thicker because of the increase in the number of electric circuits caused due to the increase in the number of electric devices loaded on the sliding seats and the like. Therefore, when routing the wiring material in the protector, it takes time to do the routing work since the space for passing the wiring material through is narrow. In order to secure the space for passing the wiring material through, for example, it is necessary to increase the size of the protector in the width direction. However, there is no space around the protector, which makes it difficult to deal with such an issue by changing the external size of the protector.

SUMMARY OF THE INVENTION

The present invention is designed in view of the aforementioned circumstances, and it is an object thereof to provide a protector capable of shortening the time required for the routing work of wiring materials.

In order to achieve the above mentioned object, a protector according to one aspect of the present invention includes a case main body that forms a housing space part for housing a folded part of a wiring material routed in a vehicle, the case main body including a main body opening part that allows the housing space part to communicate with outside; and a cover member that closes the main body opening part, wherein the case main body includes; a first guide space part that communicates with the housing space part, and leads, to the outside, a first extension part connected to one side of the folded part of the wiring material; and a second guide space part that communicates with the housing space part, and leads, to the outside, a second extension part connected to another side of the folded part of the wiring material, the cover member includes; a cover main body part that faces the housing space part in a closed state where the main body opening part of the case main body is closed by the cover member, a first cover part that extends in a first direction from an end part of the cover main body part in the first direction of longitudinal direction, the first cover part facing the first guide space part in the closed state; and a second cover part that extends in the first direction from the end part of the cover main body part in the first direction and curves in lateral direction that is orthogonal to the longitudinal direction of the cover main body part, the second cover part facing the second guide space part in the closed state, the first cover part and the second cover part are at positions overlapping with each other in the longitudinal direction when viewed from the lateral direction of the cover main body part; and form an insertion space for passing the wiring material through in the lateral direction when viewed from orthogonal direction that is orthogonal to the longitudinal direction and the lateral direction of the cover main body part, and the first cover part includes; a movable part that is movable in the orthogonal direction with respect to the cover main body part when viewed from the lateral direction of the cover main body part; and a hinge part that rotatably connects the cover main body part and the movable part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
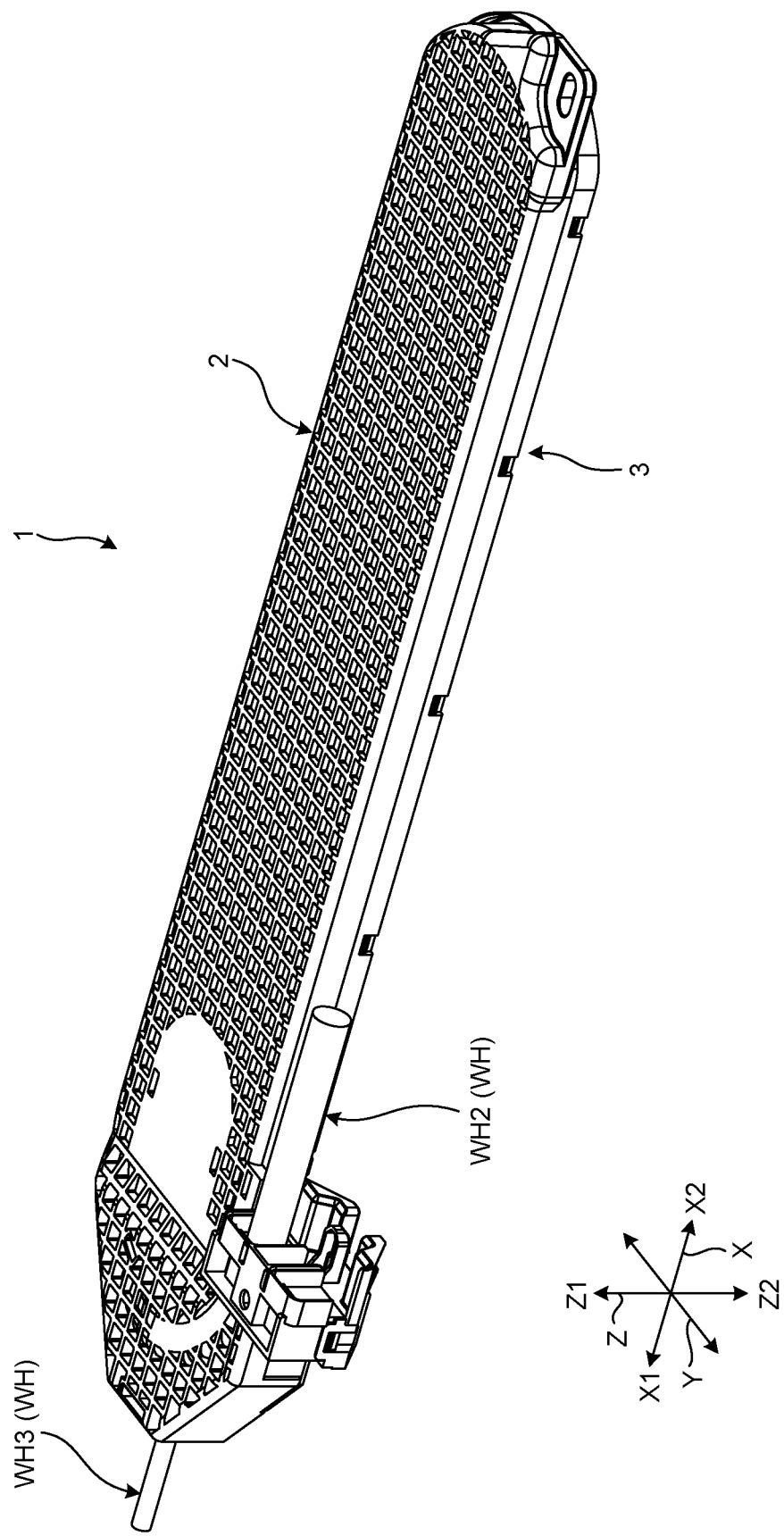
FIG. 1 is a perspective view illustrating a schematic configuration of a protector according to an embodiment.

Hereinafter, an embodiment of a protector according to the present invention will be described in detail with reference to the accompanying drawings. Note, however, that the present invention is not limited by the embodiment described below. Furthermore, structural components in the following embodiment include those that can be easily replaced by those skilled in the art, or those that are substantially the same.

EMBODIMENT

A protector 1 according to the present embodiment will be described with reference to FIG. 1 to FIG. 6. The protector 1 according to the present embodiment illustrated in FIG. 1 and FIG. 2 protects part of a wiring material WH that is routed to a sliding seat, a sliding door or the like, not illustrated, loaded on a vehicle such as an automobile (not illustrated) by housing it inside as an extra length part. The protector 1 is formed in a substantially casing shape, and is installed in a vehicle by fastening a mounting part provided on the outer face thereof to the car body using bolts or the like (not illustrated). The protector 1 is configured with a case main body 2 and a cover member 3.

Note here that an X direction in the drawings is defined as a longitudinal direction of the protector 1 in the present embodiment. As for the X direction, an X1 direction is defined as a first direction and an X2 direction as a second direction. A Y direction is defined as a lateral direction of the protector 1 in the present embodiment, and is a direction orthogonal to the longitudinal direction. A Z direction is defined as an orthogonal direction of the protector 1, and is the direction orthogonal to the longitudinal direction and the lateral direction. As for the Z direction, a Z1 direction is defined as a third direction and a Z2 direction as a fourth direction. Note that the longitudinal direction is, for example, a direction along the front and rear direction of the vehicle in a state where the protector 1 is fixed to the car body.

The wiring material WH is, for example, a wire harness that supplies power to electrical components (not illustrated) provided in a sliding seat or the like in the vehicle. The wiring material WH has a part configured with a wire bundle in which a plurality of electric wires are bundled and a cylindrical (or tubular) exterior material covering the wire bundle, for example. The electric wire includes, for example, a conductor part (core wire) comprised of a plurality of conductive metal strands, and an insulating sheath part covering outside of the conductor part. The exterior material is, for example, a corrugated tube or the like. In a state where the wiring material WH is housed inside the protector 1, part of the wiring material WH is introduced into the protector 1 or led to the outside of the protector 1 as the sliding seat or the like slides. One end part of the wiring material WH is electrically connected to an electrical component, and the other end part is electrically connected to a battery or the like in the vehicle.

Figure 3:
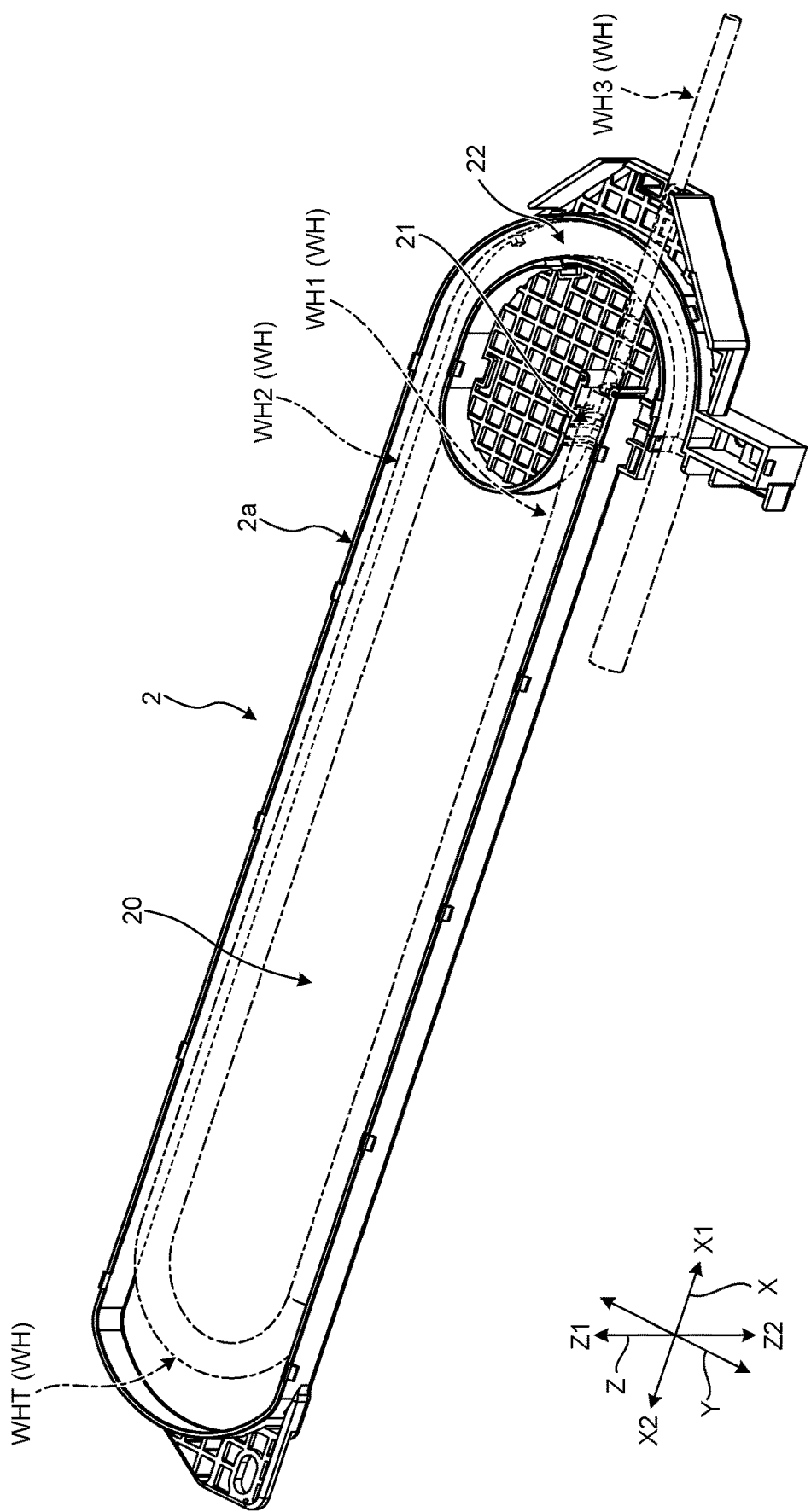
FIG. 3 is a perspective view illustrating a schematic configuration of a protector main body configuring the protector according to the embodiment.
Figure 4:
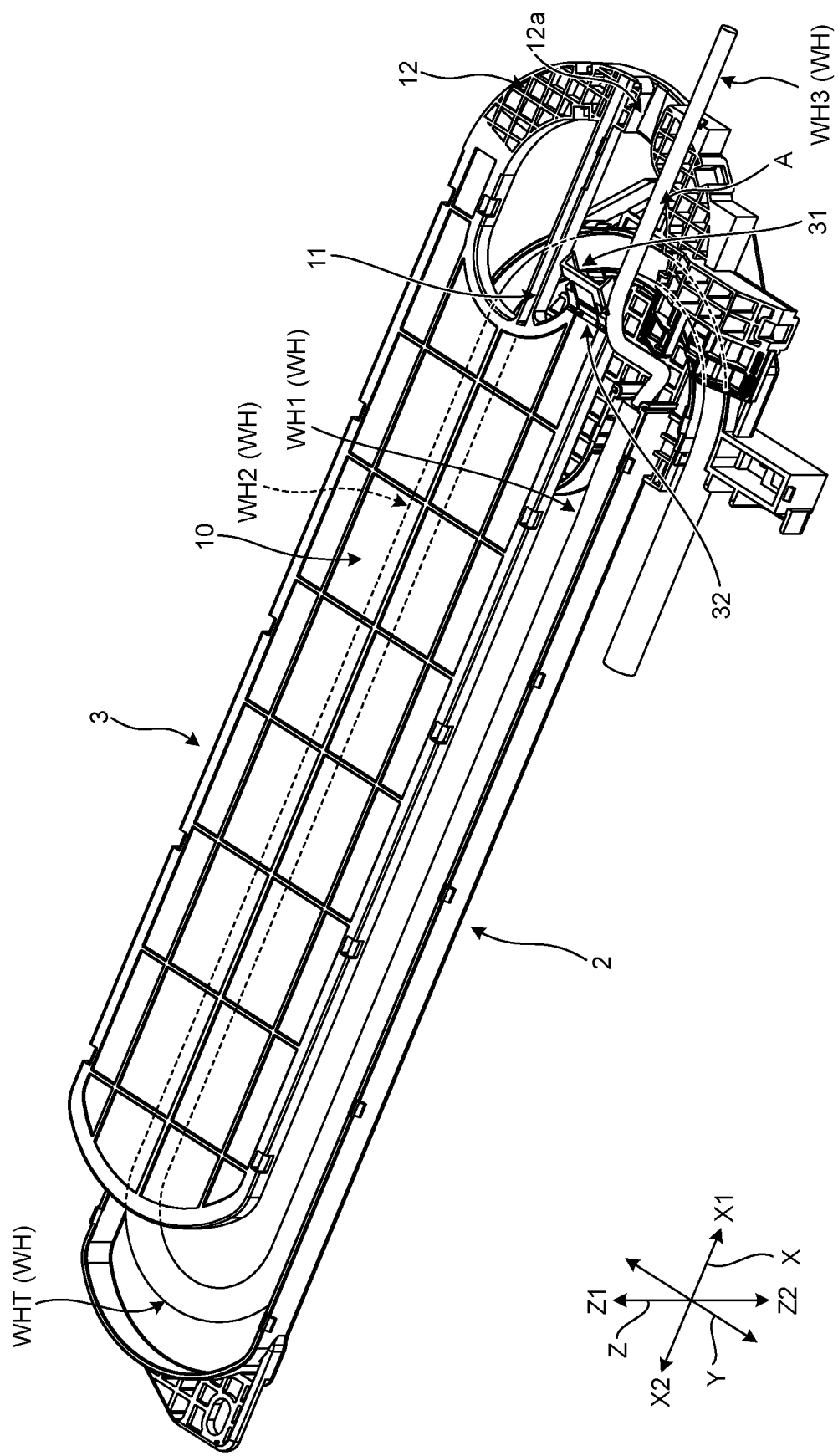
FIG. 4 is an exploded perspective view illustrating a schematic configuration of the protector according to the embodiment.
Figure 5:
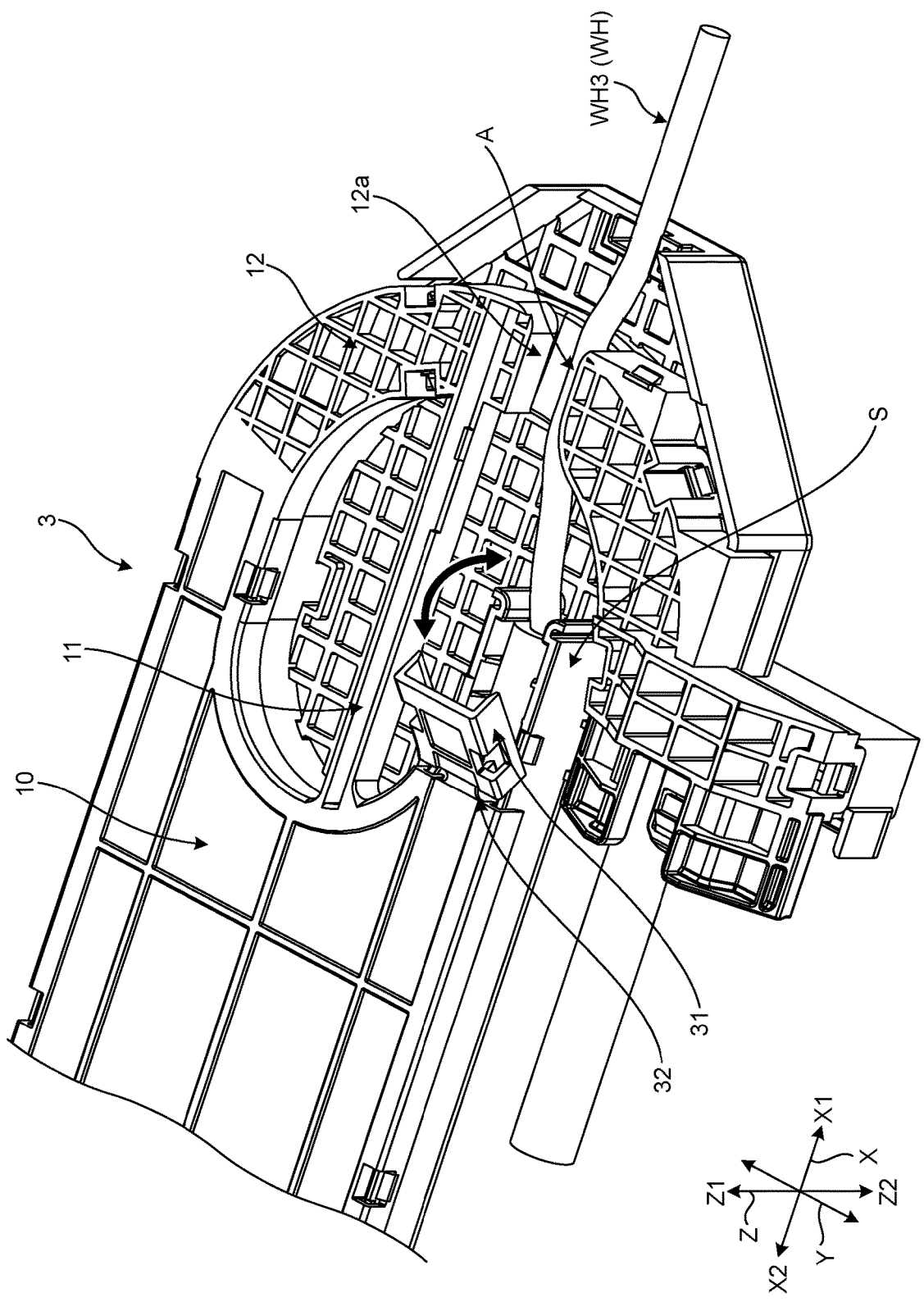
FIG. 5 is a fragmentary enlarged view illustrating a main part of the protector according to the embodiment.

Furthermore, the wiring material WH includes, in the part housed inside the protector 1, a folded part WHT, a first extension part WH1, and a second extension part WH2. The folded part WHT, the first extension part WH1, and the second extension part WH2 are configured, for example, with a wire bundle and a corrugated tube. As illustrated in FIG. 3 to FIG. 5, a third extension part WH3 extending to the outside of the protector 1 is connected to an end part of the first extension part WH1 on the opposite side from the folded part WHT. Unlike the folded part WHT, the first extension part WH1, and the second extension part WH2, the third extension part WH3 is not covered by the corrugated tube and configured, for example, with a taped wire bundle. The third extension part WH3 has an outer diameter that is thinner than those of the folded part WHT, the first extension part WH1, and the second extension part WH2.

The case main body 2 is molded using an insulating synthetic resin material or the like, and extends in the longitudinal direction. The case main body 2 is locked to the cover member 3 by a locking structure. The case main body 2 and the cover member 3 are configured as a substantially casing shape in a state of being locked by the locking structure. The case main body 2 includes a main body opening part 2a at an end part in one direction (third direction) of the orthogonal direction. The main body opening part 2a is closed by the cover member 3 in a state where the case main body 2 and the cover member 3 are locked by the locking structure. The case main body 2 forms a housing space part 20, a first guide space part 21, and a second guide space part 22 in a closed state where the main body opening part 2a is closed by the cover member 3. The housing space part 20, the first guide space part 21, and the second guide space part 22 communicate with each other.

The housing space part 20 is a space that houses the folded part WHT that is part of the wiring material WH. The housing space part 20 communicates with the outside through the main body opening part 2a. The wiring material WH housed in the case main body 2 has the first extension part WH1 placed in one direction of the lateral direction, the second extension part WH2 placed in the other direction, and the folded part WHT placed on the center side of lateral direction, when viewed from the orthogonal direction of the case main body 2.

The first guide space part 21 is a space that leads, to the outside, the first extension part WH1 that connects to one side of the folded part WHT of the wiring material WH. The first guide space part 21, in a closed state where the main body opening part 2a is closed by the cover member 3, communicates with the outside through an opening that is different from the main body opening part 2a and is formed on the first direction side of the protector 1.

The second guide space part 22 is a space that leads, to the outside, the second extension part WH2 that connects to the other side of the folded part WHT of the wiring material WH. The second guide space part 22 communicates with the outside through another opening that is different from the main body opening part 2a and is formed on the first direction side of the protector 1.

The cover member 3 is molded using an insulating synthetic resin material or the like, and extends in the longitudinal direction. The cover member 3 includes a cover main body part 10, a first cover part 11, and a second cover part 12.

The cover main body part 10 is a part that faces the housing space part 20 in the closed state where the main body opening part 2a of the case main body 2 is closed by the cover member 3. The cover main body part 10 extends in the longitudinal direction.

The first cover part 11 is a part that extends in the first direction from the end part of the cover main body part 10 in the first direction of the longitudinal direction, and faces the first guide space part 21 in the closed state where the main body opening part 2a of the case main body 2 is closed by the cover member 3. The first cover part 11 is formed in a substantially straight line shape along the longitudinal direction. The first cover part 11 includes a movable part 31 and a hinge part 32.

As illustrated in FIG. 5, the movable part 31 is a part that is movable in the one direction (third direction) of the orthogonal direction with respect to the cover main body part 10, when viewed from the lateral direction of the cover main body part 10. The movable part 31 is connected to the cover main body part 10 via the hinge part 32. The movable part 31 is formed in a U-shape that opens in the other direction (fourth direction) of the orthogonal direction when viewed from the longitudinal direction, and rotates only in the one direction (third direction) of the orthogonal direction around the hinge part 32. In other words, when the movable part 31 is to rotate in the other direction (fourth direction) of the orthogonal direction, it comes to abut against the cover main body part 10 and rotation thereof is restricted.

The hinge part 32 is a part that rotatably connects the cover main body part 10 and the movable part 31. The hinge part 32 is more flexible than the cover main body part 10 and the movable part 31. The hinge part 32 is molded to be thinner than the thickness of the cover main body part 10 and the movable part 31, for example. The hinge part 32 is positioned on the second direction side as compared with an end part 12b of the second cover part 12 on the second direction side in the longitudinal direction, when the cover main body part 10 is viewed from the orthogonal direction. The hinge part 32 and the second cover part 12 are in the positions not overlapping with each other in the longitudinal direction, when viewed from the lateral direction of the cover main body part 10.

The second cover part 12 is a part that extends in the first direction from the end part of the cover main body part 10 in the first direction, curves in the lateral direction of the cover main body part 10, and faces the second guide space part 22 in the closed state where the main body opening part 2a of the case main body 2 is closed by the cover member 3. As illustrated in FIG. 2 and FIG. 4 to FIG. 6, the second cover part 12 includes a groove part 12a that houses the third extension part WH3 in the closed state where the main body opening part 2a of the case main body 2 is closed by the cover member 3. The groove part 12a extends in the longitudinal direction.

Figure 6:
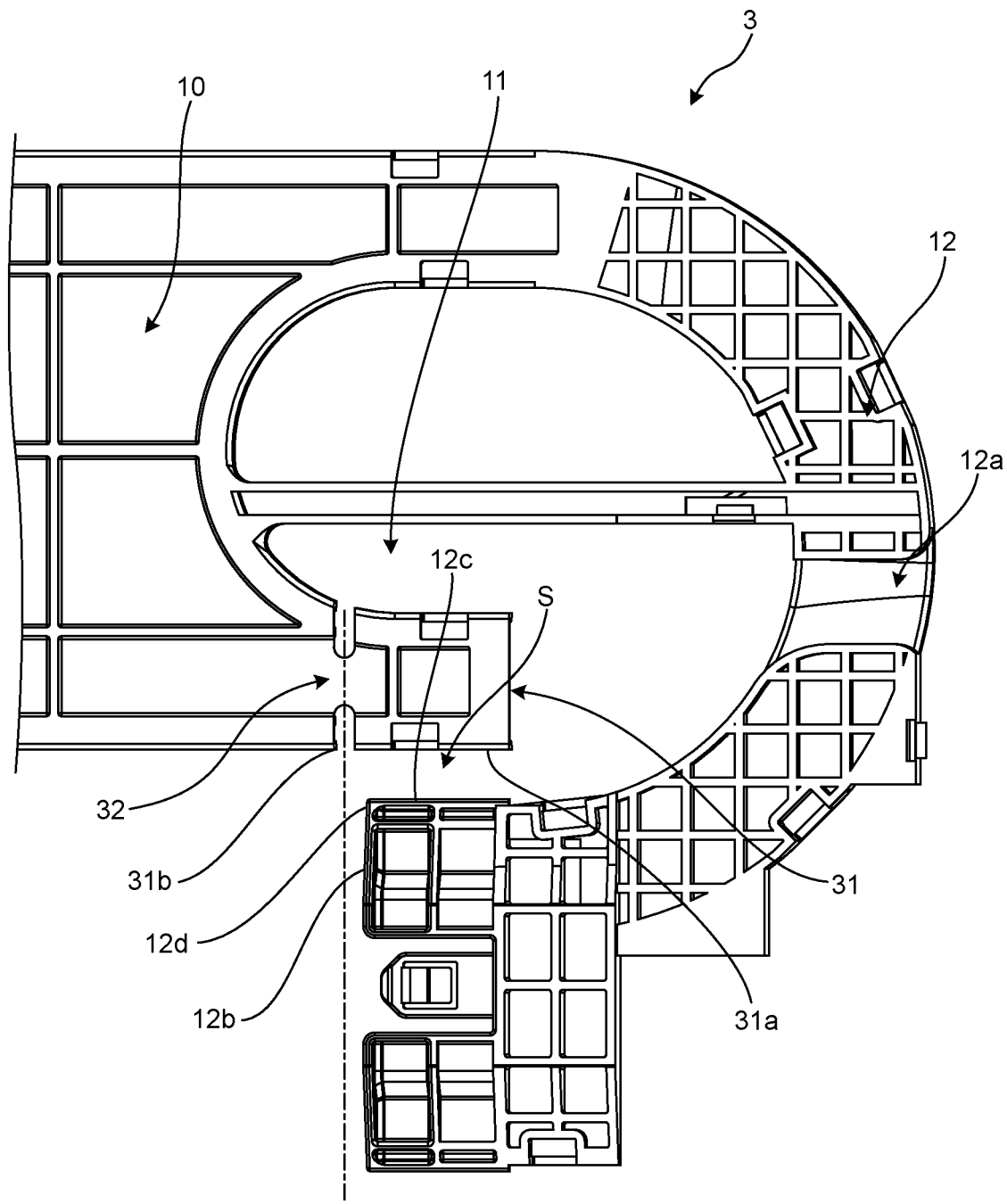
FIG. 6 is a fragmentary enlarged view illustrating a main part of a cover member according to the embodiment.

The first cover part 11 and the second cover part 12 are in the positions overlapping with each other in the longitudinal direction, when viewed from the lateral direction of the cover main body part 10. Furthermore, when viewed from the orthogonal direction of the cover main body part 10, the first cover part 11 and the second cover part 12 form an insertion space S for passing the wiring material WH through in the lateral direction, as illustrated in FIG. 6. The insertion space S is the space between a side end part 31a of the movable part 31 in one direction (outward facing side of the cover main body part 10) of the lateral direction and a side end part 12c on the other direction (inward facing side of the cover main body part 10) of the lateral direction adjacent to the end part 12b of the second cover part 12 on the second direction side. The side end part 31a and the side end part 12c directly face each other in the lateral direction when viewed from the lateral direction in a state where the movable part 31 is not rotated, but do not directly face each other in a state where the movable part 31 is rotated. The insertion space S becomes wider when the movable part 31 is rotated because the side end part 31a and the side end part 12c are relatively separated from each other, compared to the state where the movable part 31 is not rotated.

With the protector 1 according to the present embodiment, an assembly worker temporarily routes the wiring material WH to the case main body 2 before closing the main body opening part 2a of the case main body 2 by the cover member 3, as illustrated in FIG. 3. At this time, the folded part WHT of the wiring material WH is housed in the housing space part 20, the first extension part WH1 is housed in the first guide space part 21, and the second extension part WH2 is housed in the second guide space part 22. The third extension part WH3 remains in a state of extending in the first direction.

Figure 2:
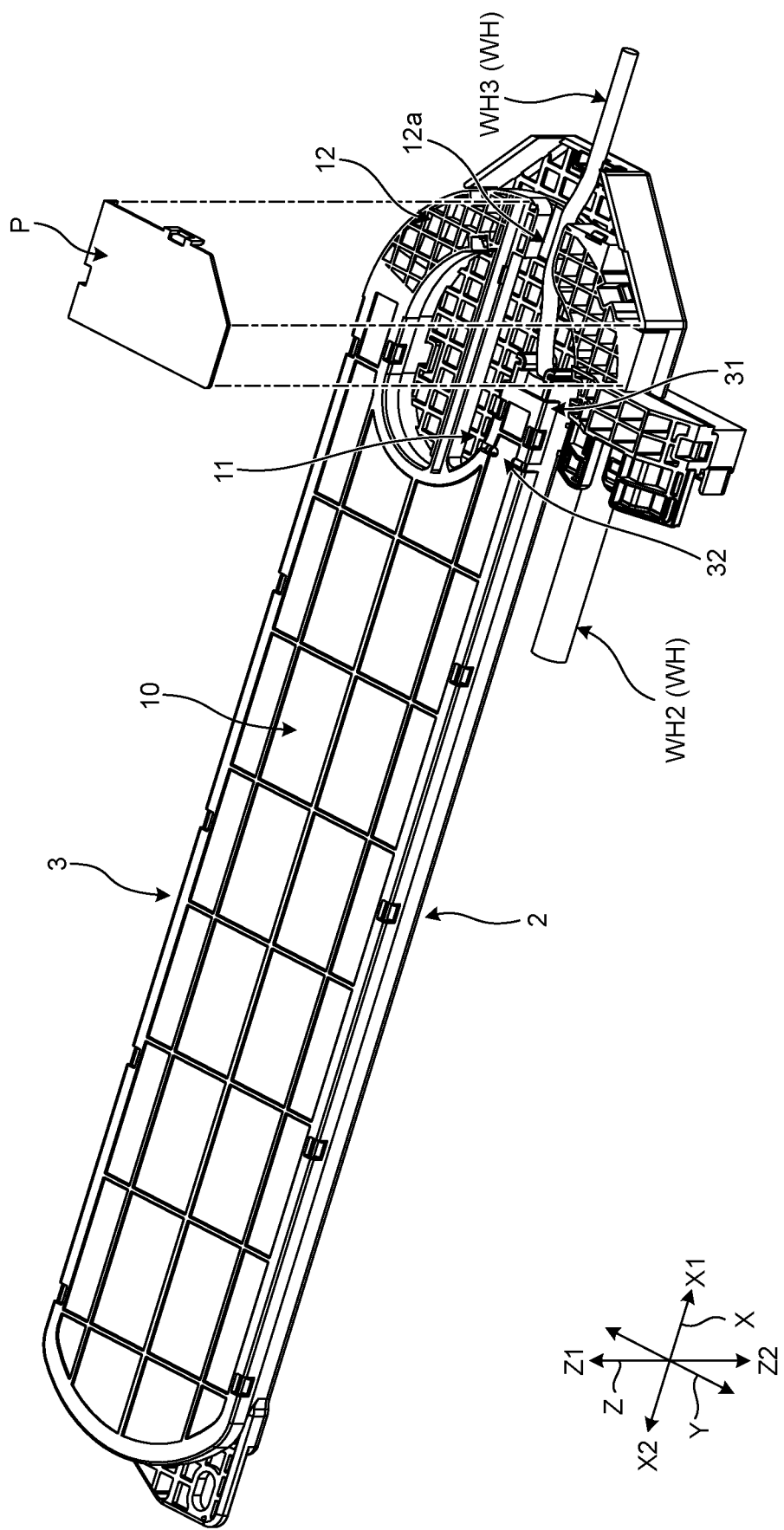
FIG. 2 is a fragmentary exploded perspective view illustrating a schematic configuration of the protector according to the embodiment.

Next, the assembly worker attaches the cover member 3 to the case main body 2. At this time, as illustrated in FIG. 4, the assembly worker rotates the movable part 31 of the cover member 3 in the one direction (third direction) of the orthogonal direction around the hinge part 32, and then passes the third extension part WH3 through the insertion space S of the cover member 3 while grasping an A part of the third extension part WH3. With the third extension WH3 facing the insertion space S, the cover member 3 is slid in the second direction with respect to the case main body 2. By placing the movable part 31 in the rotated state, the side end part 31a of the movable part 31 and the side end part 12c of the second cover part 12 are relatively separated from each other and the insertion space S becomes wider compared to a case where the movable part 31 is in an unrotated state. The third extension part WH3 is to be passed through between a region 31b of the first cover part 11 and a region 12d of the second cover part 12, as illustrated in FIG. 6. After attaching the cover member 3 to the case main body 2, the assembly worker routes and houses the third extension part WH3 in the groove part 12a and, as illustrated in FIG. 2, attaches a plate P to the cover member 3 to complete the routing work.

As described above, the protector 1 according to the present embodiment includes the case main body 2 and the cover member 3. The cover member 3 includes the cover main body part 10, the first cover part 11 that extends in the first direction from the end part of the cover main body part 10 in the first direction, and the second cover part 12 that extends in the first direction from the end part of the cover main body part 10 in the first direction and curves in the lateral direction. The first cover part 11 and the second cover part 12 are at the positions overlapping with each other in the longitudinal direction when viewed from the lateral direction of the cover main body part 10, and form the insertion space S for passing the third extension part WH3 of the wiring material WH through in the lateral direction when viewed from the orthogonal direction of the cover main body part 10. The first cover part 11 includes the movable part 31 that is movable in the orthogonal direction with respect to the cover main body part 10 when viewed from the lateral direction of the cover main body part 10, and the hinge part 32 that rotatably connects the cover main body part 10 and the movable part 31.

With such a configuration, by placing the movable part 31 in the rotated state when the assembly worker performs the routing work for routing the wiring material WH for the protector 1, the side end part 31a of the movable part 31 and the side end part 12c of the second cover part 12 are relatively separated from each other and the insertion space S becomes wider compared to a case where the movable part 31 is in an unrotated state. As a result, it becomes easier to pass the third extension part WH3 through the insertion space S compared to a case of the conventional cover member with the fixed movable part 31, so that the time required for the routing work can be shortened. In addition, the protector 1 can be configured without changing the external size thereof, since only part of the conventional cover member needs to be changed to the movable part 31 that can be rotated.

Furthermore, in the protector 1 according to the present embodiment, the hinge part 32 is positioned on the second direction side as compared with the end part 12b of the second cover part 12 on the second direction side in the longitudinal direction, when the cover main body part 10 is viewed from the orthogonal direction. This allows to increase the separated distance between the region 31b of the first cover part 11 and the region 12d of the second cover part 12 compared to a case where the hinge part 32 is positioned on the first direction side as compared with the end part 12b of the second cover part 12 on the second direction side in the longitudinal direction, when the cover main body part 10 is viewed from the orthogonal direction. As a result, when passing the third extension part WH3 through the insertion space S, the amount of contact between the third extension part WH3 and the region 31b of the first cover part 11 as well as between the third extension part WH3 and the region 12d of the second cover part 12 can be reduced to facilitate the routing work.

While the assembly worker passes the third extension part WH3 through the insertion space S when attaching the cover member 3 to the case main body 2 in the embodiment described above, the present invention is not limited thereto. For example, the third extension part WH3 may be passed through the insertion space S after attaching the cover member 3 to the case main body 2 and placing the movable part 31 in a rotated state.

Furthermore, the orthogonal direction of the above-described protector 1 may be along the vertical direction or along the horizontal direction orthogonal to the vertical direction. Moreover, the case main body 2 and the cover member 3 may be placed in opposite positions in the vertical direction.

The protector according to the present embodiment achieves an effect of shortening the time required for the routing work of the wiring materials.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protector comprising:
    a case main body that forms a housing space part for housing a folded part of a wiring material routed in a vehicle, the case main body including a main body opening part that allows the housing space part to communicate with outside; and
    a cover member that closes the main body opening part, wherein
    the case main body includes:
        a first guide space part that communicates with the housing space part, and leads, to the outside, a first extension part connected to one side of the folded part of the wiring material; and
        a second guide space part that communicates with the housing space part, and leads, to the outside, a second extension part connected to another side of the folded part of the wiring material,
    the cover member includes:
        a cover main body part that faces the housing space part in a closed state where the main body opening part of the case main body is closed by the cover member,
        a first cover part that extends in a first direction from an end part of the cover main body part in the first direction of longitudinal direction, the first cover part facing the first guide space part in the closed state; and
        a second cover part that extends in the first direction from the end part of the cover main body part in the first direction and curves in lateral direction that is orthogonal to the longitudinal direction of the cover main body part, the second cover part facing the second guide space part in the closed state,
    the first cover part and the second cover part are at positions overlapping with each other in the longitudinal direction when viewed from the lateral direction of the cover main body part; and form an insertion space for passing the wiring material through in the lateral direction when viewed from orthogonal direction that is orthogonal to the longitudinal direction and the lateral direction of the cover main body part, and
    the first cover part includes:
        a movable part that is movable in the orthogonal direction with respect to the cover main body part when viewed from the lateral direction of the cover main body part; and
        a hinge part that rotatably connects the cover main body part and the movable part.

2. The protector according to claim 1, wherein the hinge part is positioned on a second direction side that is on an opposite side of the first direction as compared with an end part of the second cover part on the second direction side in the longitudinal direction, when the cover main body part is viewed from the orthogonal direction.

3. The protector according to claim 1, wherein the hinge part and the second cover part are in the positions not overlapping with each other in the longitudinal direction, when viewed from the lateral direction of the cover main body part.

4. The protector according to claim 2, wherein the hinge part and the second cover part are in the positions not overlapping with each other in the longitudinal direction, when viewed from the lateral direction of the cover main body part.

* * * * *